No. 693,088. Patented Feb. 11, 1902.
F. L. O. WADSWORTH.
ILLUMINATING STRUCTURE.
(Application filed Apr. 1, 1898.)
(No Model.)
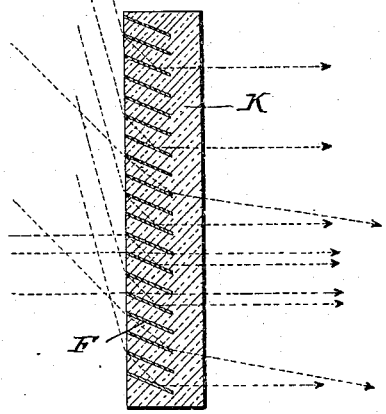
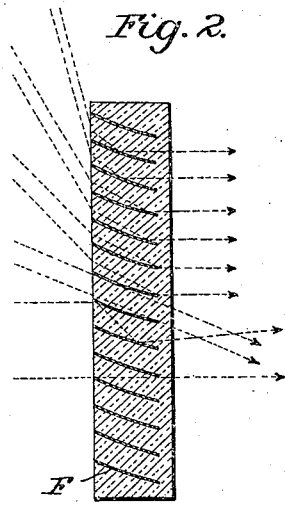
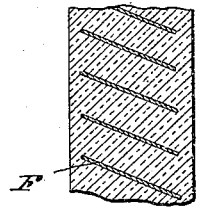
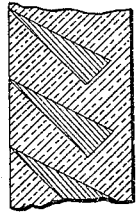
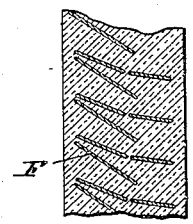
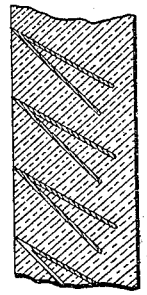
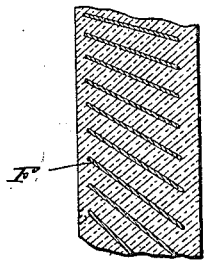
Witnesses
Inventor
F. L. O. Wadsworth
Attorneys

UNITED STATES PATENT OFFICE.

FRANK L. O. WADSWORTH, OF WILLIAMS BAY, WISCONSIN, ASSIGNOR TO WILLIAM A. BOND, TRUSTEE, OF CHICAGO, ILLINOIS.

ILLUMINATING STRUCTURE.

SPECIFICATION forming part of Letters Patent No. 693,088, dated February 11, 1902.

Application filed April 1, 1898. Serial No. 676,140. (No model.)

*To all whom it may concern:*

Be it known that I, FRANK L. O. WADSWORTH, a citizen of the United States, residing at Williams Bay, in the county of Walworth and State of Wisconsin, have invented certain new and useful Improvements in Illuminating Structures, of which the following is a specification.

It is well known that in that class of illuminating structures in which plates with reflecting-faces are employed the said faces are apt to more or less deteriorate in efficiency as reflectors from the formation of oxids or the collection of dust, moisture, &c. This has been remedied by inclosing such plates in receptacles having glass sides; but this is attended with increased cost, weight, and bulk, which it is my purpose to avoid, while also securing other advantages. To this end I embed the reflecting-plates, suitably arranged and spaced with reference to each other, in a mass of glass constituting a panel or block, as fully set forth hereinafter and as illustrated in the accompanying drawings, in which all the figures represent in section illuminating structures or parts thereof embodying my improvements.

In the construction in Figure 1, K represents a block of glass, within which are embedded a series of parallel reflecting-plates F, of any suitable material—as, for instance, plates of copper with silvered faces or plates of glass with silvered faces—the edges of the reflecting plates or elements extending to one edge of the glass block K, but being at a sufficient distance from the other to insure the integrity of the block, notwithstanding the presence of the plates. In Fig. 2 the construction is the same, except that the plates are curved. In Fig. 3 the plates are triangular in cross-section. In Fig. 4 each reflector consists of two plates meeting at an acute angle. In Figs. 5, 6, and 7 the plates are wholly embedded within the glass blocks. In Fig. 6 each reflector consists of a number of plates arranged at different angles, and in Fig. 7 the plates are arranged at successively-increasing angles.

By thus embedding the plate within the block of glass at any suitable angle I am enabled to preserve the integrity and full efficiency of the reflecting-surfaces, which can in no way be affected by dust, oxidation, moisture, or otherwise. The surfaces of the blocks may be ground flat and polished like ordinary plate-glass, and when placed in position in a window or otherwise can be readily cleaned by the same means usually employed for washing windows, and the structure thus constantly maintained at its maximum reflecting efficiency.

While the said structure may be manufactured in any suitable manner, one effective means consists in arranging the metallic strips on edge at a suitable angle and stretched tight on a suitable table or in a suitable mold and rolling or casting the molten glass around the strips to the desired thickness. Another means of forming the sheet would be to place together a number of alternate strips of glass and metal sheet or foil in the proper position with reference to each other and then subjecting the whole to the action of a sufficiently high heat to fuse or weld the successive faces together. These means I do not here claim.

The strips may have but one reflecting-face each, but preferably have two, so that light striking the under faces of one strip is reflected onto the upper face of the strip below and thence out at the second surfaces.

I have illustrated in this application different forms of reflectors embedded in glass. My invention relating only to the embedding of reflectors in the transparent body, I make no claim herein to the forms of the reflectors.

Without limiting myself to the precise construction and arrangement of the parts shown, I claim as my invention—

1. An illuminating structure consisting of a block of glass provided with one or more reflecting-plates embedded therein at an angle to the face thereof, substantially as set forth.

2. An illuminating structure consisting of a block of glass containing a series of separated reflecting-plates embedded therein, to change the direction of light in passing through the block, substantially as set forth.

3. An illuminating structure consisting of a block of glass having a series of thin metallic films embedded therein and constituting reflecting elements and each having upper and lower reflecting-faces, to change the direction of light in passing through the block, substantially as described.

4. An illuminating structure consisting of an integral block of transparent material, inclosing thin reflecting-strips having upper and lower reflecting-faces, to change the direction of light in passing through the block, substantially as set forth.

In testimony whereof I have signed my name to this specification in the presence of two subscribing witnesses.

FRANK L. O. WADSWORTH.

Witnesses:
W. CLARENCE DUVALL,
PAUL W. STEVENS.